United States Patent [19]

Beaton et al.

[11] Patent Number: 4,657,665
[45] Date of Patent: Apr. 14, 1987

[54] PROCESS FOR DEMETALLATION AND DESULFURIZATION OF HEAVY HYDROCARBONS

[75] Inventors: William I. Beaton, Wheaton, Ill.; Albert L. Hensley, Munster, Ind.; April J. Evans, Naperville, Ill.

[73] Assignee: Amoco Corporation, Chicago, Ill.

[21] Appl. No.: 811,724

[22] Filed: Dec. 20, 1985

[51] Int. Cl.$^4$ ............................................... C10G 45/04
[52] U.S. Cl. ................................. 208/216 R; 208/59; 208/112; 208/127; 208/216 PP; 208/251 H
[58] Field of Search ............... 208/216 PP, 251 H, 59, 208/112, 127

[56] References Cited

U.S. PATENT DOCUMENTS

| | | | |
|---|---|---|---|
| 3,981,796 | 9/1976 | Hilfman | 208/112 |
| 4,181,602 | 1/1980 | Quick et al. | 208/216 PP |
| 4,224,114 | 9/1980 | Hensley, Jr. et al. | 208/216 PP |
| 4,306,965 | 12/1981 | Hensley, Jr. et al. | 208/112 |
| 4,328,127 | 5/1982 | Angevine et al. | 208/216 PP |
| 4,404,097 | 9/1983 | Angevine et al. | 208/216 PP |
| 4,434,048 | 2/1984 | Schindler | 208/112 |

Primary Examiner—John Doll
Assistant Examiner—Helane Myers
Attorney, Agent, or Firm—Ekkehard Schoettle; William H. Magidson; Ralph C. Medhurst

[57] ABSTRACT

Disclosed is an improved ebullated bed process for the hydroconversion of heavy hydrocarbon feedstocks containing asphaltenes, metals, and sulfur compounds. The disclosed process is characterized by the use of a catalyst comprising a relatively small amount of cobalt, i.e., 0.4 to 0.8 wt. % incorporated with a high macropore volume Group VIB metal containing catalyst.

5 Claims, 4 Drawing Figures

PROCESS FOR DEMETALLATION AND DESULFURIZATION OF HEAVY HYDROCARBONS

BACKGROUND

This invention relates to a catalytic process for the hydroconversion of heavy hydrocarbon streams containing asphaltenic material, metals, and sulfur compounds. More particularly, this invention relates to hydroconversion using a series of ebullated bed reactors containing a catalyst having improved effectiveness and activity maintenance in the desulfurization and demetallation of metal-containing heavy hydrocarbon streams.

As refiners increase the proportion of heavier, poorer quality crude oil in the feedstock to be processed, the need grows for processes to treat the fractions containing increasingly higher levels of metals, asphaltenes, and sulfur.

It is widely known that various organometallic compounds and asphaltenes are present in petroleum crude oils and other heavy petroleum hydrocarbon streams, such as petroleum hydrocarbon residua, hydrocarbon streams derived from tar sands, and hydrocarbon streams derived from coals. The most common metals found in such hydrocarbon streams are nickel, vanadium, and iron. Such metals are very harmful to various petroleum refining operations, such as hydrocracking, hydrodesulfurization, and catalytic cracking. The metals and asphaltenes cause interstitial plugging of the catalyst bed and reduced catalyst life. The various metal deposits on a catalyst tend to poison or deactivate the catalyst. Moreover, the asphaltenes tend to reduce the susceptibility of the hydrocarbons to desulfurization. If a catalyst, such as a desulfurization catalyst or a fluidized cracking catalyst, is exposed to a hydrocarbon fraction that contains metals and asphaltenes, the catalyst will become deactivated rapidly and will be subject to premature replacement.

Although processes for the hydrotreating of heavy hydrocarbon streams, including but not limited to heavy crudes, reduced crudes, and petroleum hydrocarbon residua, are known, the use of fixed-bed catalytic processes to convert such feedstocks without appreciable asphaltene precipitation and reactor plugging and with effective removal of metals and other contaminants, such as sulfur compounds and nitrogen compounds, are not common because the catalysts employed have not generally been capable of maintaining activity and performance.

Thus, the subject hydroconversion processes are most effectively carried out in an ebullated bed system. In an ebullated bed, preheated hydrogen and resid enter the bottom of a reactor wherein the upward flow of resid plus an internal recycle suspend the catalyst particles in the liquid phase. Recent developments involved the use of a powdered catalyst which can be suspended without the need for a liquid recycle. In this system, part of the catalyst is continuously or intermittently removed in a series of cyclones and fresh catalyst is added to maintain activity. Roughly about 1 wt.% of the catalyst inventory is replaced each day in an ebullated bed system. Thus, the overall system activity is the weighted average activity of catalyst varying from fresh to very old i.e., deactivated.

Hopkins et al. in U.S. Pat. No. 4,119,531 disclose a process for hydrodemetallation of hydrocarbon streams containing asphaltenes and a substantial amount of metals, which comprises contacting the hydrocarbon stream with a catalyst consisting essentially of a small amount of a single hydrogenation metal from Group VIB or Group VIII, deposed on a large pore alumina; suitable examples of the hydrogenation metal are nickel or molybdenum. The catalyst is characterized by a surface area of at least 120 $m^2$/gm; a pore volume of at least 0.7 cc/gm and an average pore diameter of at least 125 Å units.

Hensley et al. in U.S. Pat. No. 4,297,242 disclose a multiple-stage catalytic process for hydrodemetallation and hydrodesulfurization of heavy hydrocarbon streams containing asphaltenes and a substantial amount of metals. The first stage of this process comprises contacting the feedstock in a first reaction zone with hydrogen and a demetallation catalyst comprising hydrogenation metal selected from Group VIB and/or Group VIII deposed on a large-pore, high surface area inorganic oxide support; the second stage of the process comprises contacting the effluent from the first reaction zone with a catalyst consisting essentially of hydrogenation metal selected from Group VIB deposed on a smaller pore, catalytically active support comprising alumina, said second stage catalyst having a surface area within the range of about 150 $m^2$/gm to about 300 $m^2$/gm, an average pore diameter within the range of about 90 Å to about 160 Å, and the catalyst has a pore volume within the range of about 0.4 cc/gm to about 0.9 cc/gm. Hensley et al. disclose that as little as 2.2 wt.% cobalt oxide caused more rapid deactivation of their second-stage catalyst for sulfur removal.

In U.S. Pat. No. 4,212,729 to Hensley et al., another two-stage catalytic process for hydrodemetallation and hydrodesulfurization of heavy hydrocarbon streams containing asphaltenes and metals is disclosed. In this process, the first-stage demetallation catalyst comprises a metal selected from Group VIB and from Group VIII deposed on a large-pore, high surface area inorganic oxide support. The second stage catalyst contains a hydrogenation metal selected from Group VIB deposed on a smaller pore catalytically active support having the majority of its pore volume in pore diameters within the range of about 80 Å to about 130 Å.

Other examples of multiple-stage catalytic processes for hydrotreatment of heavy hydrocarbon streams containing metals are disclosed in U.S. Pat. Nos. 3,180,820 (Gleim et al., 1965); 3,730,879 (Christman, 1973); 3,977,961 (Hamner, 1976); 3,985,684 (Arey, et al., 1977); 4,016,067 (Fischer, 1977); 4,054,508 (Milstein, 1977); 4,051,021 (Hamner, 1977); and 4,073,718 (Hamner, 1978).

The catalysts disclosed in these references contain hydrogenating components comprising one or more metals from Group VIB and/or Group VIII on high surface area support such as alumina, and such combinations of metals as cobalt and molybdenum, nickel and molybdenum, nickel and tungsten, and cobalt, nickel, and molybdenum have been found useful. Generally, cobalt and molybdenum have been preferred metals in the catalysts disclosed for hydrotreatment of heavy hydrocarbon streams, both in first-stage catalytic treatment to primarily remove the bulk of the metal contaminants, and in second-stage catalytic treatment primarily for desulfurization.

A difficulty which arises in resid hydroprocessing units employing the above catalyst systems is the formation of insoluble carbonaceous substances also known as Shell hot filtration solids. These substances cause operability problems in the hydrotreating units. Certain resids tend to produce greater amounts of solids thereby limiting the level of upgrading by the amount of these solids the hydroprocessing unit can tolerate.

Further, the higher the conversion level for given feedstocks, the greater the amount of solids formed. In high concentrations, these solids accumulate in lines and separators, causing fouling, and in some cases interruption or loss of process flow.

Accordingly, it is a general object of this invention to provide a process affording a higher conversion level for heavy hydrocarbon feedstocks that tend to form greater amounts of insoluble substances, especially that fraction of the feedstock that boils over 1,000° F.

It is another object of the present invention to provide a process that can tolerate larger amounts of insoluble carbonaceous substance producing feedstocks in the feed stream to the process.

It is yet another object of the present invention to provide a process that employs a less expensive catalyst system than conventional processes designed to handle heavy hydrocarbon feed streams and affords a longer catalyst life, i.e., stability.

These objectives can be attained by the process of the present invention which utilizes a novel catalyst to effect the hydroconversion of heavy hydrocarbon streams in a series of ebullated bed reaction zones. It has been discovered that the addition of a relatively small amount of cobalt to a high-macropore molybdenum-containing demetallation catalyst yields a single catalyst system, when utilized in an ebullated bed reactor, that provides the requisite demetallation, low solids formation, desulfurization and Ramsbottom carbon conversion.

In the two-stage prior art processes, such as those disclosed in U.S. Pat. Nos. 4,297,242, and 4,212,729, the demetallation catalyst is followed by a smaller-pore hydrotreating catalyst to ensure high-product quality. In the process of the present invention, it has been surprisingly discovered that the addition of a relatively small amount of cobalt to a high-macropore volume demetallation catalyst provides all of the above benefits in an ebullated bed reactor system. Further, it has discovered the addition of other metal promoters or a relatively greater amount of cobalt to the high-macropore demetallation catalyst does not increase the activity of the catalyst. Thus, the economics of the process of the invention are enhanced by the unexpected reduced need for expensive cobalt in the catalyst system.

SUMMARY OF THE INVENTION

This invention comprises a process for the hydrodemetallation, hydrodesulfurization, and hydroconversion of a hydrocarbon feedstock containing asphaltenes and a substantial amount of metals, which process is carried out in at least one ebullated bed reaction zone. More particularly, in the process of the invention, the hydrocarbon feedstock is contacted with hydrogen in one or a series of ebullated bed reaction zones in the presence of a hydroconversion catalyst comprising a hydrogenation component containing a relatively small amount of cobalt and a Group VIB metal deposed on a high surface area high-macropore volume-containing porous inorganic oxide support.

The Group VIB metals are present in amounts that range from about 3.5 to about 5.0 wt.% calculated as an oxide and based on total hydroconversion catalyst weight. The cobalt is present in "a relatively small amount" ranging from about 0.4 to about 0.8 wt.% calculated as CoO and based on total hydroconversion catalyst weight. The hydroconversion catalyst has a surface area of about 150 m$^2$/gm to about 220 m$^2$/gm, and a total pore volume within the range of about 0.85 cc/gm to about 1.5 cc/gm. Further, the pore volume of pores possessing diameters greater than about 1,200 Å ranges from about 0.15 cc/gm to about 0.4 cc/gm. This hydroconversion catalyst contains a considerably lower amount of metals, especially less cobalt, than the prior art hydroconversion catalysts, and hence is less expensive. It is believed the high macropore volume in the hydroconversion catalyst affords surface area accessibility to the large asphaltenic molecules that are implicated in the formation of insoluble carbonaceous substances. Additionally, metals present in the feedstock such as vanadium and nickel are deposited in these large pores.

The process of the invention converts at least 30 vol.% of the hydrocarbon fraction boiling above 1000° F. to material boiling below 1000° F. and preferably 70 vol.% of the fraction boiling above 1,000° F. to material boiling below 1,000° F.

DETAILED DESCRIPTION OF THE INVENTION

Figure 1:
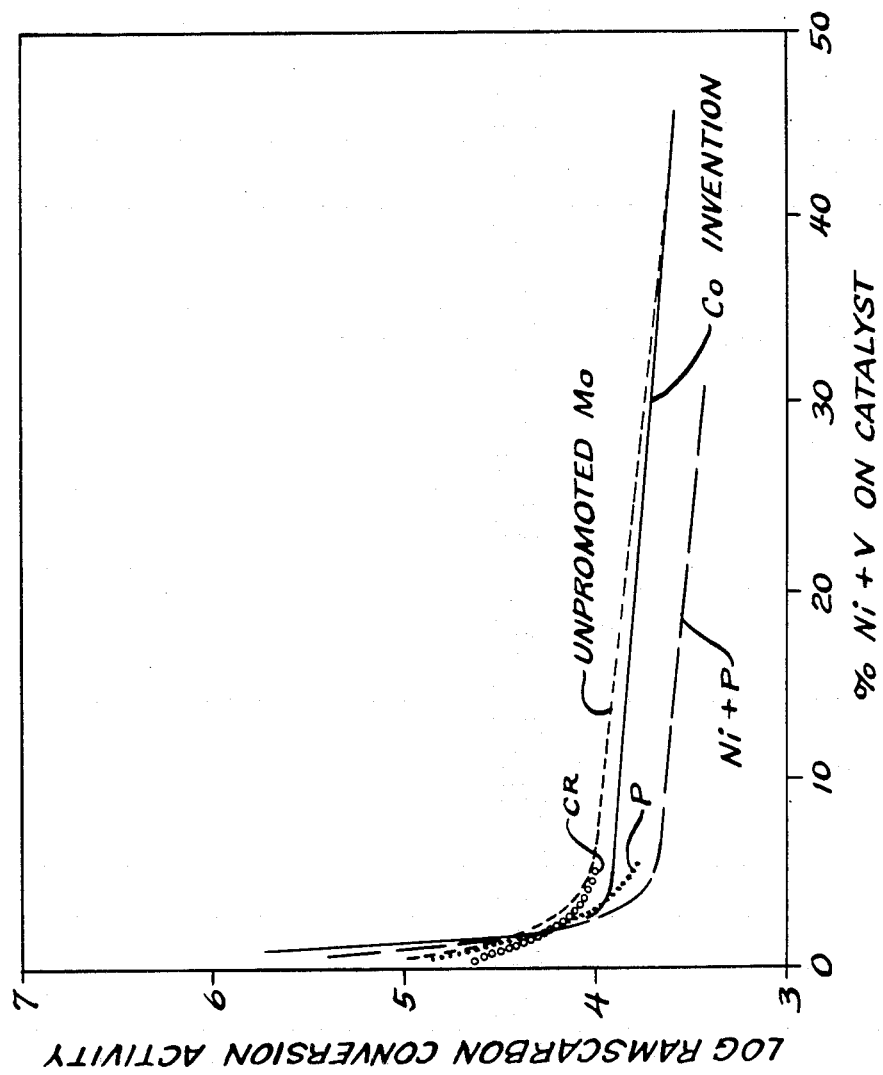
FIG. 1 depicts a plot of Ramscarbon activity versus percentage deposition of nickel and vanadium on the invention catalyst and various comparative catalysts.

Broadly, the present invention is directed to a process for the hydroconversion of heavy hydrocarbon feedstocks which contain asphaltenes, metals, nitrogen compounds, and sulfur compounds. As is well known these feedstocks contain nickel, vanadium, and asphaltenes, e.g., about 40 ppm up to more than 1,000 ppm for the combined total amount of nickel and vanadium and up to about 25 wt.% asphaltenes. A unit processing 60,000 barrels of resid per stream day is capable of producing 10% of U.S. vanadium needs per year. Further, the economics of the process of the invention are dependent upon producing a fully demetallized residual by-product, which can be used to make anode grade coke. This process is particularly useful in treating feedstocks with a substantial amount of metals containing 150 ppm or more of nickel and vanadium and having a sulfur content in the range of about 1 wt.% to about 10 wt.%. Typical feedstocks that can be treated satisfactorily by the process of the present invention contain a substantial amount of components that boil appreciably above 1,000° F. Examples of typical feedstocks are crude oils, topped crude oils, petroleum hydrocarbon residua, both atmospheric and vacuum residua, oils obtained from tar sands and residua derived from tar sand oil, and hydrocarbon streams derived from coal. Such hydrocarbon streams contain organometallic contaminants which create deleterious effects in various refining processes that employ catalysts in the conversion of the particular hydrocarbon stream being treated. The metallic contaminants that are found in such feedstocks include, but are not limited to, iron, vanadium, and nickel.

Nickel is present in the form of soluble organometallic compounds in most crude oils and residuum fractions. The presence of nickel porphyrin complexes and other nickel organometallic complexes causes severe difficulties in the refining and utilization of heavy hydrocarbon fractions, even if the concentration of such complexes is relatively small. It is known that a cracking catalyst deteriorates rapidly and its selectivity changes when in the presence of an appreciable quantity of the organometallic nickel compounds. An appreciable quantity of such organometallic nickel compounds in feedstocks that are being hydrotreated or hydrocracked harmfully affects such processes. The catalyst becomes deactivated and plugging or increasing of the pressure drop in a fixed-bed reactor results from the deposition of nickel compounds in the interstices between catalyst particles.

Iron-containing compounds and vanadium-containing compounds are present in practically all crude oils that are associated with the high Conradson carbon asphaltenic and/or asphaltenic portion of the crude. Of course, such metals are concentrated in the residual bottoms, when a crude is topped to remove those fractions that boil below about 450° F. to 600° F. If such residuum is treated by additional processes, the presence of such metals adversely affects the catalyst in such processes. It should be pointed out that the nickel-containing compounds deleteriously affect cracking catalysts to a greater extent than do iron-containing compounds. If an oil containing such metals is used as a fuel, the metals will cause poor fuel oil performance in industrial furnaces since they corrode the metal surfaces of the furnaces.

nickel, and iron, are often present in various hydrocarbon streams, other metals are also present in a particular hydrocarbon stream. Such metals exist as the oxides or sulfides of the particular metal, or as a soluble salt of the particular metal, or as high molecular weight organometallic compounds, including metal naphthenates and metal porphyrins, and derivatives thereof.

Another problem associated with hydrotreating heavy hydrocarbons is the formation of insoluble carbonaceous substances from the asphaltenic fraction of the feedstock which cause operability problems. The amount of such insolubles formed increases with the amount of material boiling over 1,000° F. which is converted or with an increase in the reaction temperature employed. These insoluble substances, also known as Shell hot filtration solids, create the operability difficulties for the hydroconversion unit and thereby circumscribe the temperatures and feeds the unit can handle. In other words, the amount of solids formed limit the conversion of a given feedstock. Operability difficulties as described above begin to manifest themselves when the solids levels reach about the 1.0 to 1.3 wt.% level. Levels below 1.0 wt.% are generally recommended to prevent fouling of process equipment. A description of the Shell hot filtration test is found at A. J. J., Journal of the Inst. of Petroleum (1951) 37, pp. 596–604 by Van Kerkvoort, W. J. and Nieuwstad, A. J. J. which is incorporated herein by reference.

Although the present invention is in no way limited to the following speculative mechanism, it is believed that such insoluble carbonaceous substances are formed when the heavy hydrocarbons are converted in the hydroconversion unit, thereby rendering them a poorer solvent for the unconverted asphaltenic fraction and hence creating the insoluble carbonaceous substances. The process of the present invention decreases the formation of the insolubles by having most of its surface area in the hydroconversion catalyst accessible by very large pores so that most of the catalyst surface is accessible to large asphaltenic molecules. Also, the large pores facilitate deposition of nickel and vanadium in the hydrotreating catalyst.

The process of the present invention serves to reduce Shell hot filtration solids and thereby increase operability while simultaneously permitting the conversion of heavy hydrocarbons which are prone to produce large amounts of Shell hot filtration solids. An additional advantage of the present invention is the relatively low cost of the invention hydroconversion catalyst in comparison to the prior art hydroconversion catalysts thereby enhancing the overall economics of the process by the invention. This benefit arises from the reduced amount of hydrogenation metals used in the hydroconversion catalyst and from the longer life, i.e., stability of the hydroconversion catalyst.

As explained above, the relatively small amount of cobalt in the hydrotreating catalyst produces the required product quality and meets operability guidelines when utilized in an ebullated bed reaction zone. It has been discovered that adding a relatively small amount of cobalt to the high macropore-volume-containing demetallation catalyst provides a higher initial activity than the subject demetallization catalyst containing no cobalt. This benefit of higher initial activity is less significant in a fixed bed operation since the catalyst containing the small amount of cobalt rapidly deactivates to about the same activity as if there were no cobalt present. However, in an ebullated bed system, the subject increase in initial activity is meaningful since there is an intermittent or continuous addition of invention catalyst, thereby, increasing and maintaining overall system activity. Since the overall activity of an ebullated bed system is the weighted average activity of all catalyst present varying from fresh to deactivated, the overall activity is increased by constant or intermittent addition of invention catalyst possessing a relatively higher initial activity.

Thus, essentially, the present invention is carried out in one or a series of ebullated bed reactors. As previously elucidated, an ebullated is one in which the solid catalyst particles are kept in random motion by the upward flow of liquid and gas. An ebullated bed typically has a gross volume of at least 10 percent greater and up to 70% greater than the solids thereof in a settled state. The required ebullation of the catalyst particles is maintained by introducing the liquid feed, inclusive of recycle if any to the reaction zone at linear velocities ranging from about 0.02 to about 0.4 feet per second and preferably, from about 0.05 to about 0.20 feet per second.

The hydroconversion catalyst of the present invention comprises a hydrogenation component and a high macropore volume-containing high-surface area porous inorganic oxide support. Suitable hydroconversion catalysts comprise catalytic amounts of a hydrogenation component selected from the Group VIB metals and cobalt. These metals are deposed on a porous inorganic oxide support such as alumina, aluminum phosphate, or aluminum silicates; suitably, the composition of the demetallation catalyst comprises from about 3.5 to about 5.0 wt.% of the Group VIB metal, calculated as the oxide, and from about 0.4 to about 0.8 wt.% cobalt calculated as the oxide CoO, based upon the total weight of the catalyst composition. The Group VIB classification of the Periodic Table of Elements can be found on page 628 of WEBSTER'S SEVENTH NEW COLLEGIATE DICTIONARY, G. & C. Merriam Company, Springfield, Mass., U.S.A. (1965). While calculated as the oxide, the hydrogenation metal components of the catalyst can be present as the element, as an oxide thereof, as a sulfide thereof, or mixtures thereof. Molybdenum, which is generally superior to chromium and tungsten in demetallation and desulfurization activity, is a preferred Group VIB metal component in the demetallation catalyst.

The hydroconversion catalyst used in the process of the present invention can be prepared by the typical commercial method of impregnating a large-pore, high-surface area porous inorganic oxide support. Appropriate commercially available alumina, preferably calcined at about 800°–1,600° F. (426°–872° C.), for about 0.5 to about 10 hours, can be impregnated to provide a suitable first-stage catalyst having an average pore diameter of about 125 Å to about 295 Å, a surface area ranging from about 150 m$^2$/gm to about 220 m$^2$/gm, and a total pore volume within the range of about 0.85 cc/gm to about 1.5 cc/gm.

Preferably, the surface area ranges from about 170 m$^2$/gm to about 200 m$^2$/gm, a total pore volume of about 1.0 cc/gm to about 1.35 cc/gm. The pore volume of pores drawing a diameter greater than 1,200 Å ranges from about 0.15 to about 0.40 cc/gm, preferably from about 0.2 cc/gm to about 0.35 cc/gm. The alumina can be impregnated with a solution, usually aqueous, containing a heat-decomposable compound of the metal to be placed on the catalyst, drying, and calcining the impregnated material. If the impregnation is to be performed with more than one solution, it is understood that the metals may be applied in any order. The drying can be conducted in air at a temperature of about 80° F. (27° C.) to about 350° F. (177° C.) for a period of 1 to 50 hours. Typically, the calcination can be carried out at a temperature of about 800° F. (426° C.) to about 1,200° F. (648° C.) for a period of from 0.5 to 16 hours.

Alternatively, the inorganic oxide support can be prepared by mixing a sol, hydrosol, or hydrogel of the inorganic oxide with a gelling medium, such as ammonium hydroxide followed by constant stirring to produce a gel which is subsequently dried, pelleted, or extruded, and calcined. The hydrogenation metal can then be incorporated into the support as described above or during the gellation step.

While the hydroconversion catalyst of the present invention can be present in the form of pellets, spheres, or extrudates, other shapes are also contemplated, such as a clover-leaf shape, cross-shape, or C-shape as disclosed in U.S. Pat. Nos. 3,674,680 and 3,764,565 (Hoekstra, et al.).

The operating conditions for the hydroconversion of heavy hydrocarbon streams, such as petroleum hydrocarbon residua and the like, comprise a pressure within the range of about 1,000 psia (68 atmos) to about 3,000 psia (204 atmos), an average catalyst bed temperature within the range of about 700° F. (371° C.) to about 850° F. (454° C.), a liquid hourly space velocity (LHSV) within the range of about 0.1 volume of hydrocarbon per hour per volume of catalyst to about 5 volumes of hydrocarbon per hour per volume of catalyst, and a hydrogen recycle rate or hydrogen addition rate within the range of about 2,000 standard cubic feet per barrel (SCFB) (356 m$^3$/m$^3$) to about 15,000 SCFB (2,671 m$^3$/m$^3$). Preferably, the operating conditions comprise a total pressure within the range of about 1,200 psia to about 2,000 psia (81–136 atmos); an average catalyst bed temperature within the range of about 730° F. (387° C.) to about 820° F. (437° C.); and a LHSV within the range of about 0.1 to about 4.0; and a hydrogen recycle rate or hydrogen addition rate within the range of about 5,000 SCFB (890 m$^3$/m$^3$) to about 10,000 SCFB (1,781 m$^3$/m$^3$). Generally, the process temperatures and space velocities are selected so that at least 30 vol.% of the feed fraction boiling above 1,000° F. is converted to a product boiling below 1,000° F. and more preferably so that at least 70 vol.% of the subject fraction is converted to a product boiling below 1,000° F.

If the process of the present invention were to be used to treat hydrocarbon distillates, the operating conditions would comprise a hydrogen partial pressure within the range of about 200 psia (13 atmos) to about 3,000 psia (204 atmos); an average catalyst bed temperature within the range of about 600° F. (315° C.) to about 800° F. (426° C.); a LHSV within the range of about 0.4 volume of hydrocarbon per hour per volume of catalyst to about 6 volumes of hydrocarbon recycle rate or hydrogen addition rate within the range of about 1,000 SCFB (178 m$^3$/m$^3$) to about 10,000 SCFB (1,381 m$^3$/m$^3$). Preferred operating conditions for the hydrotreating of hydrocarbon distillates comprise a hydrogen partial pressure within the range of about 200 psia (13 atmos) to about 1,200 psia (81 atmos); an average catalyst bed temperature within the range of about 600° F. (315° C.) to about 750° F. (398° C.); a LHSV within the range of about 0.5 volume of hydrocarbon per hour per volume of catalyst to about 4 volumes of hydrocarbon per hour per volume of catalyst; and a hydrogen recycle rate or hydrogen addition rate within the range of about 1,000 SCFB (178 m$^3$/m$^3$) to about 6,000 SCFB (1,068 m$^3$/m$^3$).

EXAMPLE 1

The present example compares the process of the present invention with other processes, wherein a high-macropore volume molybdenum-containing demetallation catalyst was promoted with other promoters, namely chromium, phosphorus, and nickel plus phosphorous. The unpromoted case is also compared with the process of the invention, as is the case where substantially more cobalt is used.

Catalyst Preparations

A demetallation catalyst possessing the following properties set out in Table I was impregnated with various solutions containing the desired promoters. To prepare the cobalt promoted catalyst of the present invention, 4.91 grams of cobalt acetate were dissolved in 300 cc of water to form an aqueous solution. 200 g. of the above-described demetallation catalyst were then impregnated with 178 cc of the above-described solution. The cobalt impregnated demetallation catalyst was then heated in a vacuum oven overnight at 90° C. Prior to using the catalyst in a pilot plant, the catalyst was calcined at 1,000° F. for 1 hour.

The comparative catalysts were prepared in a substantially similar manner using aqueous impregnation solutions to impregnate the above demetallation catalyst to arrive at catalysts possessing the characteristics set out in Table II below.

The aqueous impregnation solutions included $(NH_4)_6Mo_7O_{24}\cdot 4(H_2O)$ to impregnate molybdenum, $Ni(NO_3)_2\cdot 6H_2O$ to impregnate nickel, $H_3PO_4$ to impregnate phosphorous, and $(NH_4)_2Cr_2O_7$ to impregnate chromium. Each catalyst was subsequently calcined at 1000° F. for one hour, except the nickel plus phosphorus impregnated catalyst was calcined at 800° F. for one hour.

TABLE I

| | |
|---|---|
| MoO₃ | 4.1 wt. % |
| BET surface area | 184 m²/g |
| Pore volume < 1200Å diameter | .89 cc/g |
| Pore volume > 1200Å diameter | .33 cc/g |
| Average pore diameter | 193Å |

$$\frac{4 V^*}{\text{Å}} \times 10^4$$

V* designates the pore volume of pores having a diameter less than 1200Å.

| Pore volume in pores: | |
|---|---|
| 150–1200Å diameter | 0.38 cc/g |
| 70–150 | .46 cc/g |
| 50–70 | .04 cc/g |
| <50Å | .01 cc/g |
| Surface area in pores: | |
| 150–1200Å diameter | 39 m²/g |
| 70–150 | 115 m²/g |
| 50–70 | 16.2 m²/g |
| <50 | 14.2 m²/g |

TABLE II

| | COMPARATIVE CATALYSTS | | | | | F |
|---|---|---|---|---|---|---|
| | A | B | C | D | E | (invention) |
| Wt. % CoO | | | | 1.7 | | 0.6 |
| Wt. % Cr₂O₃ | 1.0 | | | | | |
| Wt. % NiO | | 2.4 | | | | |
| Wt. % P | | 2.5 | .7 | | | |
| Wt. % MoO₃ | 4.1 | 11.3 | 4.1 | 10.7 | 4.1 | 4.1 |

Each of the above catalysts was then tested in a pilot plant to determine RAMS carbon conversion activity and desulfurization activity versus the amount of nickel and vanadium deposited on the catalyst from the feed charged to the pilot plant.

Catalysts A, C, D, E, and the invention catalyst were tested in an upflow fixed-bed pilot unit having a reactor with a ⅜" ID and a length of 36". Starting from the bottom up, the reactor was first loaded with 6 inches of ⅛" nonporous ceramic balls, then 2 inches of crushed nonporous α-alumina, then a mixture of 40 cc catalyst plus 40 cc of crushed nonporous α-alumina, then filled with ⅛" nonporous ceramic balls and finally topped with a stainless steel screen. High-sulfur heavy vacuum gas-oil was then charged to the reactor while the reactor was heated 300° F. for 2½ hours. The pilot unit was then pressurized to 2,000 psig with hydrogen. The reactors were then heated to 750° F., the feed pump was started, and temperatures were increased to the process temperature. Then the pilot unit was operated continuously at process conditions described in Table III below for each catalyst test mentioned above.

The Ni+P promoted catalyst, Catalyst B, was tested in an upflow fixed-bed pilot unit with two reactors having a ⅜" ID and a 32" length. Starting from the bottom, each reactor was loaded with 4 inches of ⅛" nonporous ceramic balls, followed by 1 inch of 10/14 mesh crushed porous Alundum, then a mixture of 20 cc catalyst plus 20 cc of 10/14 mesh crushed porous Alundum, then with ⅛" nonporous ceramic balls, and finally topped with stainless steel screen. The reactors were filled with high sulfur heavy vacuum gas oil and heated at 300° F. overnight. The pilot unit was then pressurized to 2000 psig with hydrogen, the reactors were heated to 750° F., and the feed pump was started. The pilot unit was operated continuously at process conditions described in Table III.

The process conditions employed in each of the above tests are set out below in Table III:

TABLE III

PROCESS CONDITIONS

| Promoter | Cr | Cr, Catalyst A | Ni + P, Catalyst B | | | | | P, Catalyst C | |
|---|---|---|---|---|---|---|---|---|---|
| Days | 1–13 | 14–21 | 1–6 | 7–8 | 9–23 | 24–33 | 34–52 | 1–5 | 6–21 |
| Temperature, °F. | 781 | 771 | 750 | 766 | 781 | 781 | 780 | 786 | 777 |
| H² rate, SCFH | 0.5 | 0.5 | 0.50 | 0.5 | 0.5 | 1.0 | 0.5 | 0.5 | 0.5 |
| Space velocity, U/V | .18 | .18 | .18 | .18 | .18 | .18 | .18 | .17 | .17 |
| Feed | A | A | A | A | A | B | A | A | A |
| % Ni + V on catalyst | 0–3.5 | 3.5–5.7 | 0–1.3 | 1.3–1.8 | 1.8–5.7 | 5.7–24.5 | 24.6–29.4 | 0–1.3 | 1.3–5.7 |

| Promoter | High Co/Mo Catalyst D | | | | | |
|---|---|---|---|---|---|---|
| Days | 1–12 | 13–21 | 22–27 | 28–39 | 40–47 | 48–54 |
| Temperature, °F. | 789 | 779 | 791 | 791 | 780 | 780 |
| H² rate, SCFH | 0.5 | 0.5 | 1.0 | 0.5 | 0.5 | 0.5 |
| Space velocity, U/V | .18 | .18 | .94 | .18 | .18 | .31 |
| Feed | A | A | B | A | A | A |
| % Ni + V on catalyst | 0–3.3 | 3.3–5.6 | 5.6–19.3 | 19.3–22.1 | 22.1–24.1 | 24.1–27.1 |

| Promoter | Unpromoted Mo Catalyst E | | | | | | |
|---|---|---|---|---|---|---|---|
| Days | 1–21 | 22–32 | 32–46 | 47–51 | 52–59 | 60–66 | 67–75 |
| Temperature, °F. | 790 | 790 | 790 | 789 | 800 | 779 | 780 |
| H2 rate, SCFH | 0.5 | 1.0 | 0.5 | 0.5 | 0.5 | 0.5 | 0.5 |
| Space velocity, U/V | .17 | .94 | .14 | .22 | .22 | .22 | .17 |
| Feed | A | B | A | A | A | A | A |
| % Ni + V on catalyst | 0–5.8 | 5.8–30.3 | 30.3–33.0 | 33.0–34.6 | 34.6–37.3 | 37.3–39.5 | 39.5–41.6 |

| Promoter | Co Invention Catalyst F | | | | | | |
|---|---|---|---|---|---|---|---|
| Days | 1–17 | 18–21 | 22–31 | 32–40 | 41–51 | 52–61 | 63–78 |

TABLE III-continued

| PROCESS CONDITIONS | | | | | | | |
|---|---|---|---|---|---|---|---|
| Temperature, °F. | 782 | 772 | 782 | 779 | 770 | 790 | 780 |
| H2 rate, SCFH | 0.5 | 0.5 | 1.0 | 0.5 | 0.5 | 0.5 | 0.5 |
| Space velocity, U/V | .18 | .18 | .94 | .18 | .18 | .18 | .18 |
| Feed | A | A | B | A | A | A | A |
| % Ni + V on catalyst | 0–4.9 | 4.9–6.1 | 6.1–30.1 | 30.1–32.8 | 32.8–36.0 | 36.0–39.0 | 39.0–43.7 |

| Promoter | | | Co Invention | | |
|---|---|---|---|---|---|
| Days | 79–85 | 86–110 | 111–112 | 113–127 | 128–137 |
| Temperature, °F. | 795 | 780 | 780 | 780 | 780 |
| H2 rate, SCFH | 0.5 | 1.0 | 1.0 | 1.0 | 0.5 |
| Space velocity, U/V | .18 | .57 | .60 | .94 | .19 |
| Feed | A | A | B | B | A |
| % Ni + V on catalyst | 43.7–45.8 | 45.8–62.5 | 62.5–65.7 | 65.7–95.5 | 95.5–98.4 |

Table IV below sets out the feedstock properties of the feeds used in the above-described tests.

TABLE IV

| FEED PROPERTIES | | |
|---|---|---|
| Feed | A | B |
| API gravity ° | 6.6 | 7.3 |
| Carbon, wt. % | 84.72 | 84.40 |
| Hydrogen, wt. % | 10.35 | 10.36 |
| Nitrogen, wt. % | 0.48 | 0.62 |
| Sulfur, wt. % | 3.91 | 3.75 |
| Nickel, ppm | 52 | 112 |
| Vanadium, ppm | 228 | 450 |
| Ramscarbon, wt. % | 21.0 | 15.0 |
| 1,000° F.+, wt. % | 91.4 | 71.2 |

The following Tables V through X set out the results of the above tests. The tables show wt.% sulfur and Ramscarbon in the reactor effluent versus wt.% of nickel plus vanadium deposited on the catalyst from the feed. These values were used to calculate the Ramscarbon and hydrodesulfurization activities were calculated using pseudo-second order plug flow kinetics. Activities for the Ni+P promoter test were corrected for the higher thermal severity of this catalyst test. The higher thermal residence time in the test of the Ni+P catalyst gave lower % S and % Ramscarbon in the product at a given temperature than other tests which had a lower thermal residence time, since porous Alundum was mixed with the catalyst as described above. Previous tests of the unpromoted Mo catalyst and the Co invention catalyst established that Ramscarbon conversion activities are about 18% higher and desulfurization activities are about 22% higher at the higher thermal residence times. Thus, to compare the Ni+P test (high thermal residence time) with tests of other promoters (low thermal residence times), for the Ni+P test, Ramscarbon conversion activities were decreased by 18% and desulfurization activities were decreased by 22% in order to arrive at a fair comparison with the invention catalyst and the other comparative catalyst tests.

TABLE V

| INVENTION Low CoMo | | | |
|---|---|---|---|
| Temp °F. | % S | % RC | % Ni + V On Catalyst |
| 778.1 | | | .30 |
| 781.4 | .0970 | 1.50 | .89 |
| 783.5 | .2530 | | 1.17 |
| 784.1 | .3450 | 3.26 | 1.46 |
| 782.6 | .2140 | | 1.74 |
| 783.4 | .3180 | 5.57 | 2.03 |
| 781.2 | | | 2.33 |
| 782.4 | .3800 | 6.36 | 2.91 |
| 782.2 | .4100 | 6.43 | 3.20 |
| 782.2 | | | 3.49 |

TABLE V-continued

| INVENTION Low CoMo | | | |
|---|---|---|---|
| Temp °F. | % S | % RC | % Ni + V On Catalyst |
| 782.7 | | | 3.78 |
| 783.3 | .4600 | 6.81 | 4.37 |
| 781.3 | .4600 | 6.85 | 4.94 |
| 772.2 | | | 5.23 |
| 771.3 | .7100 | 8.26 | 5.52 |
| 771.8 | | | 5.80 |
| 771.5 | .7400 | 8.47 | 6.09 |
| 782.9 | | | 8.53 |
| 782.9 | 1.9000 | | 10.96 |
| 783.0 | | | 13.40 |
| 782.7 | 2.0300 | | 15.79 |
| 782.7 | | | 18.17 |
| 780.2 | 2.1500 | | 20.50 |
| 780.1 | | | 22.83 |
| 780.0 | 2.1500 | | 25.16 |
| 779.9 | | | 27.65 |
| 779.8 | 2.3400 | | 30.14 |
| 779.9 | | | 30.41 |
| 779.3 | .9200 | 7.73 | 30.67 |
| 779.3 | | | 30.97 |
| 779.4 | 1.0100 | 8.53 | 31.27 |
| 779.4 | | | 31.56 |
| 779.8 | 1.0600 | 8.27 | 31.86 |
| 779.6 | | | 32.16 |
| 778.8 | .9800 | 7.97 | 32.46 |
| 780.4 | .9500 | 8.05 | 32.76 |
| 768.3 | | | 33.05 |
| 769.3 | 1.2000 | 6.47 | 33.35 |
| 771.0 | | | 33.65 |
| 768.7 | 1.1900 | 9.53 | 33.95 |
| 771.2 | 1.1700 | 9.43 | 34.24 |
| 770.5 | | | 34.54 |
| 770.5 | 1.1800 | 9.31 | 34.84 |
| 770.4 | | | 35.13 |
| 770.8 | 1.2000 | 9.36 | 35.43 |
| 770.6 | | | 35.72 |
| 770.2 | 1.1800 | 9.09 | 36.02 |
| 791.0 | | | 36.32 |
| 789.1 | | | 36.61 |
| 792.1 | .8600 | | 36.91 |
| 788.5 | | | 37.21 |
| 790.6 | .8800 | 7.32 | 37.81 |
| 790.0 | .8300 | 7.36 | 38.11 |
| 792.7 | | | 38.41 |
| 790.1 | .8500 | 7.50 | 38.70 |
| 789.8 | | | 39.00 |
| 779.0 | | | 39.29 |
| 779.2 | | | 39.59 |
| 779.1 | 1.1100 | 8.67 | 39.88 |
| 779.2 | 1.1300 | 8.70 | 40.46 |
| 776.8 | | | 40.75 |
| 780.6 | 1.1000 | 8.82 | 41.04 |
| 781.4 | | | 41.33 |
| 781.0 | 1.0800 | 8.67 | 41.63 |
| 779.4 | | | 41.92 |
| 780.4 | 1.1900 | 8.98 | 42.50 |
| 779.9 | | | 42.79 |
| 780.6 | 1.1200 | 8.89 | 43.08 |
| 779.8 | | | 43.38 |

TABLE V-continued
INVENTION
Low CoMo

| Temp °F. | % S | % RC | % Ni + V On Catalyst |
|---|---|---|---|
| 780.2 | 1.1600 | 8.81 | 43.67 |
| 796.3 | | | 43.97 |
| 795.6 | .8700 | 7.02 | 44.56 |
| 794.6 | | | 44.86 |
| 796.0 | .9100 | 7.07 | 45.16 |
| 793.6 | | | 45.46 |
| 794.4 | .8800 | 7.57 | 45.75 |
| 781.1 | | | 46.40 |
| 780.6 | | | 47.05 |
| 780.4 | 2.5400 | 13.82 | 47.70 |
| 780.9 | | | 48.35 |
| 780.8 | 2.5200 | 14.29 | 49.00 |
| 778.6 | | | 49.67 |
| 780.3 | 2.5000 | 13.75 | 50.33 |
| 780.4 | 2.4400 | 13.51 | 51.01 |
| 780.3 | | | 51.68 |
| 780.0 | 2.5000 | 13.73 | 52.36 |
| 780.5 | | | 53.03 |
| 780.1 | 2.4100 | 13.34 | 53.70 |
| 780.2 | | | 54.38 |
| 780.3 | 2.3000 | 14.08 | 55.06 |
| 780.3 | | | 55.74 |
| 780.1 | | | 56.43 |
| 779.9 | 2.2700 | 13.43 | 57.11 |
| 779.6 | | | 57.80 |
| 779.5 | 2.3300 | 13.74 | 58.47 |
| 780.4 | | | 59.14 |
| 780.0 | | | 59.81 |
| 779.9 | | | 60.49 |
| 780.5 | | | 61.16 |
| 780.3 | 2.2900 | 13.67 | 61.84 |
| 780.3 | | | 62.51 |
| 780.6 | | | 64.11 |
| 780.2 | 1.8800 | | 65.70 |
| 780.1 | | | 67.76 |
| 780.5 | 2.4500 | | 69.82 |
| 780.7 | | | 71.89 |
| 780.2 | 2.4700 | | 73.89 |
| 780.6 | | | 75.90 |
| 780.3 | 2.5800 | | 77.88 |
| 779.7 | | | 79.85 |
| 780.2 | 2.5800 | | 81.67 |
| 780.9 | | | 83.48 |
| 780.7 | 2.5200 | | 85.49 |
| 780.6 | | | 87.37 |
| 780.4 | 2.6500 | | 89.25 |
| 780.5 | | | 91.34 |
| 779.7 | 2.8200 | | 93.44 |
| 780.4 | | | 95.53 |
| 779.4 | | | 95.82 |
| 779.8 | 1.5000 | 9.35 | 96.10 |
| 779.3 | | | 96.39 |
| 779.8 | 1.5400 | 9.50 | 96.68 |
| 779.8 | | | 96.97 |
| 779.3 | 1.5400 | 9.84 | 97.26 |
| 778.7 | | | 97.53 |
| 779.3 | 1.5000 | 9.93 | 97.80 |
| 779.8 | 1.5700 | 9.67 | 98.09 |
| 780.1 | | 9.74 | 98.38 |

TABLE VI
NO PROMOTER

| Temp °F. | % S | % RC | % Ni + V On Catalyst |
|---|---|---|---|
| 790.6 | | | .27 |
| 789.0 | .2530 | 2.41 | .54 |
| 789.0 | .2530 | 2.41 | .81 |
| 791.9 | .4000 | | 1.02 |
| 790.5 | .3790 | 3.53 | 1.30 |
| 790.7 | .3720 | | 1.58 |
| 786.7 | .3670 | 4.02 | 1.86 |
| 792.1 | .4200 | | 2.15 |
| 787.6 | .3920 | 4.33 | 2.71 |
| 792.6 | .3310 | | 2.99 |
| 788.3 | .3730 | 4.62 | 3.28 |

TABLE VI-continued
NO PROMOTER

| Temp °F. | % S | % RC | % Ni + V On Catalyst |
|---|---|---|---|
| 793.1 | .3770 | | 3.56 |
| 788.2 | .3790 | 5.12 | 3.84 |
| 790.0 | | | 4.12 |
| 791.7 | .4400 | 5.03 | 4.67 |
| 785.9 | .4200 | | 4.94 |
| 789.1 | .4000 | 5.30 | 5.21 |
| 786.6 | | | 5.49 |
| 790.9 | .5000 | 4.84 | 5.76 |
| 790.0 | 1.5500 | | 8.28 |
| 790.2 | 1.7500 | | 10.81 |
| 790.2 | 1.8200 | | 13.28 |
| 789.8 | 1.8800 | 9.58 | 15.72 |
| 789.0 | 1.9200 | | 18.13 |
| 789.5 | 1.9000 | 9.62 | 20.57 |
| 789.9 | 1.8900 | | 23.02 |
| 789.5 | 1.9100 | 9.52 | 25.45 |
| 789.7 | 1.9400 | | 27.88 |
| 789.5 | 1.9600 | 9.61 | 30.30 |
| 789.0 | .5700 | | 30.51 |
| 788.9 | .5000 | 3.62 | 30.71 |
| 789.1 | .5400 | | 30.83 |
| 789.7 | .7000 | 4.15 | 30.84 |
| 788.2 | .5600 | | 30.87 |
| 788.4 | .5500 | 3.41 | 31.27 |
| 787.8 | .6200 | | 31.44 |
| 790.2 | .6100 | | 31.66 |
| 789.8 | .5700 | 3.25 | 31.88 |
| 789.6 | .6800 | | 32.11 |
| 786.9 | .6700 | 5.39 | 32.34 |
| 789.8 | .5900 | 4.74 | 32.79 |
| 787.0 | .6500 | | 33.02 |
| 791.3 | 1.0000 | 7.43 | 33.38 |
| 789.0 | 1.0300 | | 33.72 |
| 789.4 | 1.1300 | 8.06 | 34.05 |
| 789.1 | 1.0600 | | 34.40 |
| 789.0 | 1.1900 | 8.96 | 34.59 |
| 800.6 | .8400 | | 34.96 |
| 800.2 | .8800 | 6.06 | 35.30 |
| 800.7 | .7800 | | 35.52 |
| 800.3 | .8600 | 6.76 | 35.88 |
| 800.1 | .8900 | 6.06 | 36.24 |
| 800.2 | .8900 | | 36.96 |
| 800.2 | 1.0000 | | 37.26 |
| 778.0 | 1.2300 | | 37.60 |
| 779.6 | 1.4000 | 9.59 | 37.93 |
| 779.6 | 1.4300 | | 38.22 |
| 778.7 | 1.4300 | 9.75 | 38.54 |
| 778.0 | 1.5300 | 10.15 | 39.16 |
| 779.2 | 1.5700 | 10.24 | 39.45 |
| 778.4 | .7400 | 5.39 | 39.73 |
| 779.2 | 1.0200 | 7.66 | 39.99 |
| 779.4 | 1.0400 | 7.67 | 40.26 |
| 779.2 | 1.0800 | | 40.53 |
| 779.3 | 1.1100 | 8.36 | 40.80 |
| 780.0 | 1.1300 | 8.43 | 41.35 |
| 779.6 | 1.2400 | | 41.58 |

TABLE VII
Cr PROMOTER

| Temp °F. | % S | % RC | % Ni + V On Catalyst |
|---|---|---|---|
| 778.6 | | | .21 |
| 779.5 | .5600 | 3.96 | .42 |
| 779.8 | .5100 | | .70 |
| 782.3 | .4500 | 4.79 | 1.26 |
| 782.1 | .4200 | | 1.54 |
| 781.5 | .4200 | 5.29 | 1.82 |
| 781.1 | .4500 | | 2.10 |
| 781.5 | .4300 | 5.29 | 2.66 |
| 782.0 | .4100 | 5.66 | 3.22 |
| 782.3 | .4200 | 6.30 | 3.50 |
| 770.5 | .5300 | | 3.77 |
| 771.0 | | 7.56 | 4.05 |
| 771.0 | .6300 | | 4.32 |
| 771.3 | .6100 | 7.40 | 4.87 |
| 770.9 | .6300 | | 5.15 |

TABLE VII-continued

Cr PROMOTER

| Temp °F. | % S | % RC | % Ni + V On Catalyst |
|---|---|---|---|
| 771.1 | | 7.43 | 5.42 |
| 771.9 | .7000 | 7.97 | 5.70 |

TABLE VIII

Ni + P PROMOTER

| Temp °F. | % S | % RC | % Ni + V On Catalyst |
|---|---|---|---|
| 752.3 | | | .26 |
| 750.0 | .1700 | 3.97 | .53 |
| 750.0 | .2520 | 3.16 | .79 |
| 750.0 | | | .79 |
| 750.0 | | | 1.04 |
| 748.6 | .4100 | 7.20 | 1.29 |
| 767.9 | | | 1.55 |
| 765.0 | .3100 | 6.11 | 1.81 |
| 780.0 | | | 2.07 |
| 780.0 | .1900 | 4.56 | 2.33 |
| 781.0 | | | 2.57 |
| 781.3 | .3730 | 6.51 | 2.83 |
| 781.6 | | | 3.09 |
| 782.1 | .3400 | 6.08 | 3.34 |
| 780.6 | | | 3.60 |
| 780.1 | .4300 | 6.43 | 3.86 |
| 781.6 | | | 4.12 |
| 781.5 | .4100 | 6.34 | 4.37 |
| 781.7 | | | 4.63 |
| 781.8 | .4300 | 6.38 | 4.89 |
| 782.0 | | | 5.14 |
| 781.8 | .4900 | 6.65 | 5.40 |
| 781.2 | | | 5.65 |
| 781.8 | | | 6.75 |
| 780.8 | | | 8.94 |
| 780.6 | 1.8300 | | 11.13 |
| 780.5 | | | 13.29 |
| 780.4 | 1.9000 | | 13.92 |
| 781.8 | 1.9700 | | 16.07 |
| 780.7 | 2.1500 | | 18.15 |
| 781.1 | | | 20.18 |
| 780.9 | 2.0600 | | 22.37 |
| 781.5 | | | 24.55 |
| 782.0 | | | 24.80 |
| 782.4 | .9500 | | 25.06 |
| 781.2 | | | 25.31 |
| 779.7 | .8800 | 7.50 | 25.56 |
| 781.0 | | | 25.82 |
| 780.9 | .7700 | 7.02 | 26.08 |
| 781.0 | | | 26.34 |
| 781.0 | .8500 | 7.78 | 26.59 |
| 781.1 | | | 26.85 |
| 780.3 | .8900 | 7.81 | 27.11 |
| 780.7 | | | 27.37 |
| 780.0 | .9300 | 8.02 | 27.62 |
| 780.1 | | | 27.88 |
| 779.6 | .9400 | | 28.13 |
| 780.4 | | | 28.39 |
| 780.2 | .9600 | 8.14 | 28.64 |
| 780.3 | | | 28.89 |
| 780.2 | .9900 | 8.63 | 29.13 |
| 780.2 | 1.0100 | 8.29 | 29.39 |

TABLE IX

P PROMOTER

| Temp °F. | % S | % RC | % Ni + V On Catalyst |
|---|---|---|---|
| 784.6 | | | .27 |
| 784.6 | .2900 | 3.04 | .54 |
| 787.5 | .4300 | | .77 |
| 787.0 | .3870 | 2.91 | 1.33 |
| 776.4 | | | 1.61 |
| 776.6 | .5500 | 6.48 | 1.89 |
| 777.0 | | | 2.18 |
| 777.1 | .5700 | 6.78 | 2.72 |
| 776.9 | .5500 | 6.68 | 3.28 |
| 777.3 | .5300 | 6.82 | 3.55 |
| 776.1 | | | 3.82 |
| 776.3 | .5700 | 6.91 | 4.08 |
| 776.7 | | | 4.35 |
| 776.3 | .6000 | 7.23 | 4.89 |
| 775.9 | | | 5.16 |
| 776.5 | .6000 | 7.69 | 5.43 |
| 778.2 | .6600 | 7.84 | 5.70 |

TABLE X

High CoMo

| Temp °F. | % S | % RC | % Ni + V On Catalyst |
|---|---|---|---|
| 788.3 | .0450 | 1.21 | .27 |
| 788.8 | .0670 | | .55 |
| 789.3 | .1030 | 2.21 | .82 |
| 789.8 | .1590 | | 1.10 |
| 790.5 | | | 1.37 |
| 790.5 | .1510 | | 1.64 |
| 788.8 | .2460 | 3.24 | 1.89 |
| 789.7 | | | 2.17 |
| 789.6 | .2360 | 4.46 | 2.44 |
| 789.9 | | | 2.71 |
| 789.2 | .2610 | 4.56 | 2.99 |
| 790.1 | .2830 | 4.06 | 3.26 |
| 779.1 | | | 3.53 |
| 780.4 | .4200 | 6.93 | 3.80 |
| 779.5 | | | 4.06 |
| 777.4 | .5400 | 6.84 | 4.58 |
| 778.9 | | 7.05 | 4.84 |
| 779.1 | | 7.01 | 5.11 |
| 780.2 | .5300 | | 5.38 |
| 780.0 | .5300 | 7.60 | 5.64 |
| | | | 7.93 |
| 791.1 | | | 10.22 |
| 790.4 | 1.7400 | | 12.52 |
| 791.0 | | | 14.79 |
| 790.9 | 1.8400 | | 17.06 |
| 790.8 | | | 19.33 |
| 791.8 | | | 19.60 |
| 791.0 | .5500 | 3.17 | 19.86 |
| 791.0 | .5800 | 4.42 | 20.38 |
| 790.5 | .6200 | 5.99 | 20.57 |
| 791.3 | .6900 | 6.25 | 20.79 |
| 790.8 | .6700 | 6.54 | 20.91 |
| 792.4 | .6700 | 7.01 | 21.11 |
| 790.8 | .7500 | | 21.31 |
| 790.5 | .7000 | 7.00 | 21.83 |
| 790.5 | .7700 | | 22.05 |
| 780.3 | .9800 | 8.18 | 22.30 |
| 779.8 | .9700 | | 22.57 |
| 780.1 | .9900 | 8.62 | 22.83 |
| 780.0 | 1.0200 | | 23.09 |
| 780.1 | .9800 | 8.38 | 23.61 |
| 779.9 | 1.0100 | 9.08 | 23.87 |
| 780.0 | .9700 | | 24.13 |
| 780.1 | 1.4300 | 10.37 | 24.55 |
| 779.7 | 1.4600 | | 24.96 |
| 779.9 | 1.4500 | 10.85 | 25.38 |
| 779.3 | 1.5000 | | 25.80 |
| 779.6 | 1.4700 | 10.72 | 26.22 |
| 779.9 | 1.4900 | | 26.63 |
| 779.9 | 1.4900 | 10.66 | 27.05 |

FIGS. 1–4 depict the results of the above tests. The curves depicted in each of FIGS. 1–4 were derived through the use of an exponential nonlinear regression analysis of the natural log of activities calculated from data points from the tests. The curves for desulfurization data from catalysts A, C, and E were derived by using a linear regression analysis of log activity data. FIG. 1 shows ramscarbon activities for the invention catalyst F and the catalysts A, B, C, and E versus nickel plus vanadium deposited on the respective catalysts. From FIG. 1, it is noted that the initial activity of unpromoted catalyst, catalyst E is modest but became stable after the initial deactivation. The chromium-promoted catalyst, A, and phosphorous-promoted catalyst, C, displayed lower initial ramscarbon conversion activities than unpromoted catalyst, E. The nickel plus phosphorous-promoted catalyst, B, showed a higher initial activity than the unpromoted catalyst, E, which would improve product quality in an ebullated bed reactor since a high initial activity increases average activity in the reactor. However, catalyst B deactivated more than the unpromoted catalyst, E. The catalyst of the invention, F, also shows a high initial activity. The deactivation is less severe than for the nickel plus phosphorous catalyst B, and reaches a steady state deactivation line out equal with the unpromoted catalyst, catalyst E. The higher initial activity of the invention catalyst enhances the overall average activity in an ebullated reactor system in accordance with the process of the invention.

Figure 2:
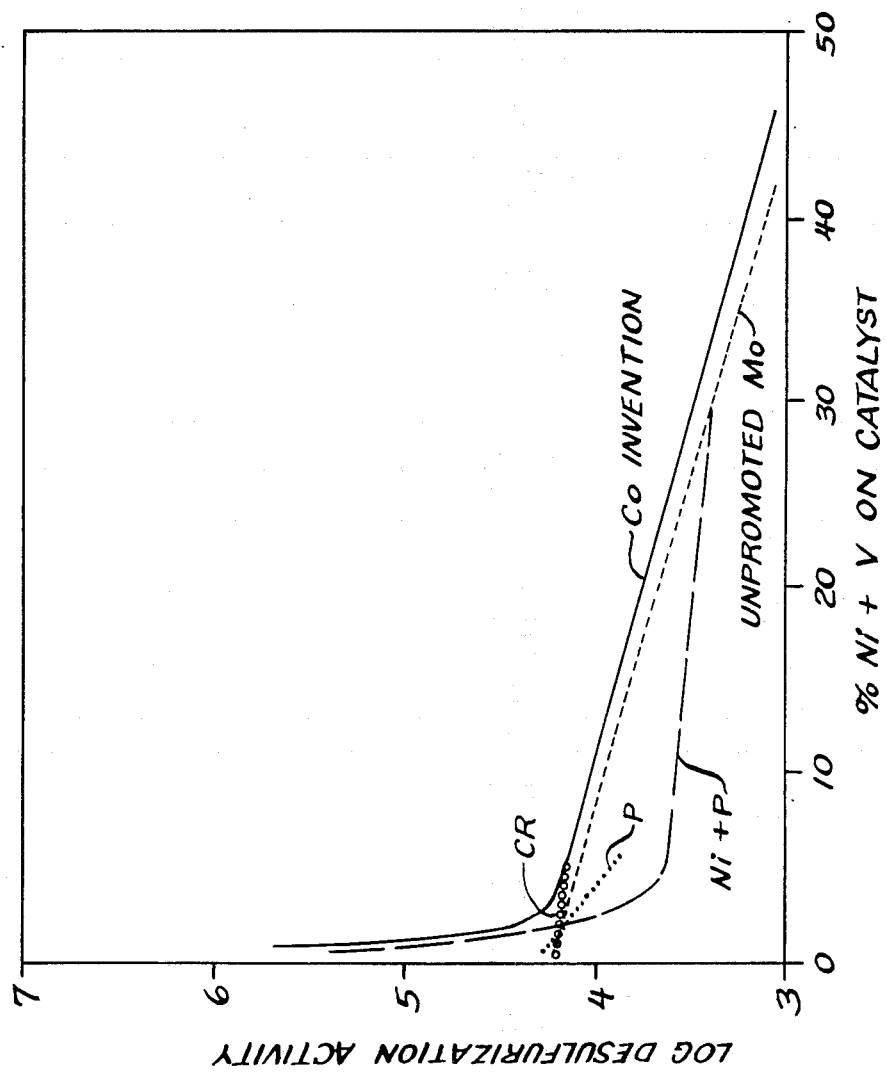
FIG. 2 depicts a plot of hydrodesulfurization activity versus deposition of nickel and vanadium on the invention catalyst and various comparative catalysts.

FIG. 2 shows the desulfurization activities versus nickel plus vanadium deposited on the various comparative catalysts and the invention catalyst. This figure shows the similar trends as in FIG. 1 except that the unpromoted catalyst, chromium catalyst, and phosphorous catalyst showed much lower initial activities than the nickel plus phosphorous catalyst or the invention catalyst. The invention catalyst, F, displayed higher desulfurization activity than catalysts A, B, C, or E at all amounts of nickel plus vanadium deposited on the catalysts. It should be noted that carbonaceous solids production was similar for all tests.

Figure 3:
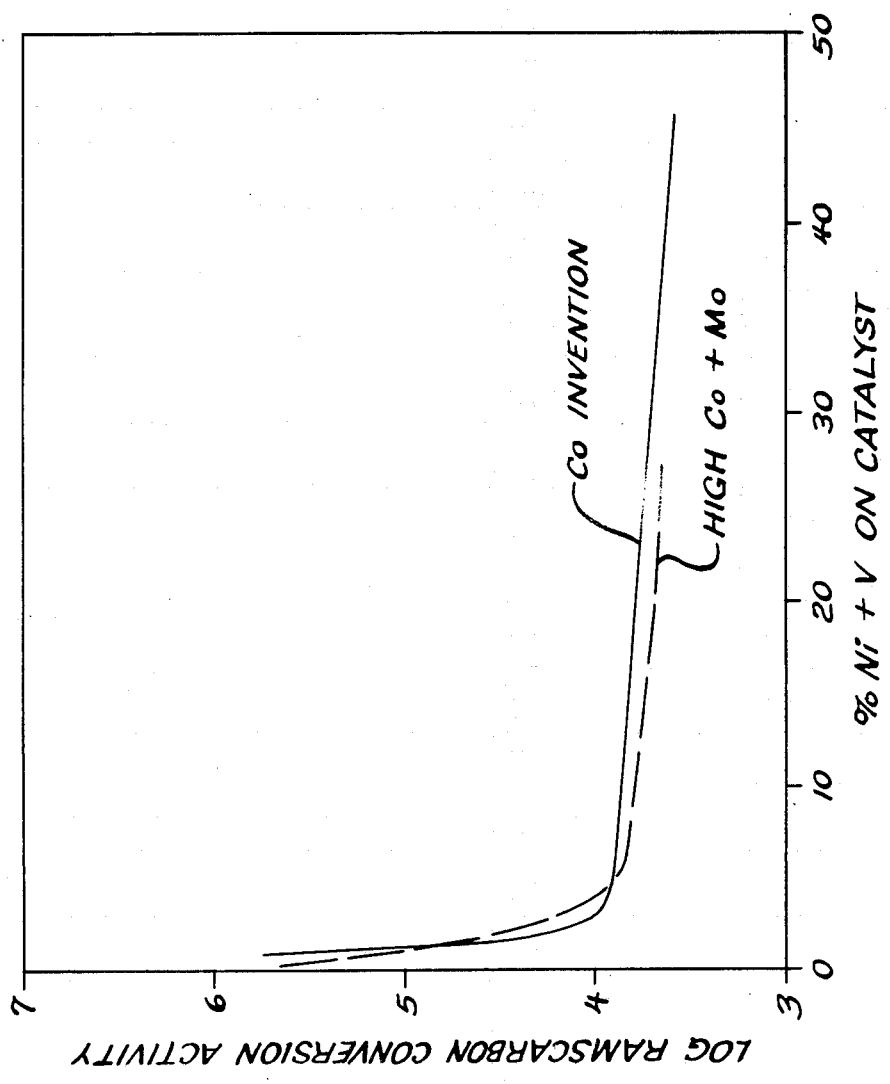
FIGS. 3–4 depict plots of Ramscarbon activity and hydrodesulfurization activity versus deposition of nickel and vanadium, respectively, on the invention catalyst and a comparative catalyst having a substantially greater level of catalytic metals.
Figure 4:
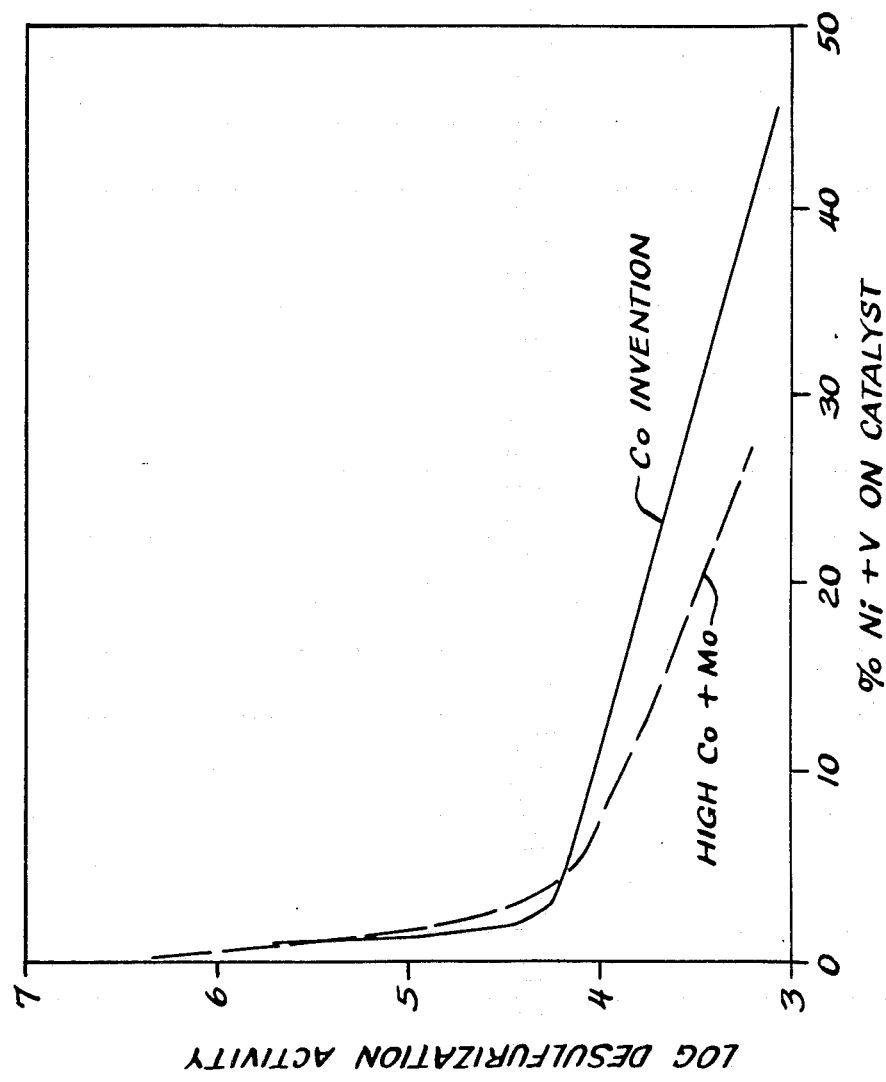

FIGS. 3 and 4 show the activity curves respectively for ramscarbon conversion and desulfurization for the invention catalyst and catalyst D, the demetallation catalyst containing a higher level of Co promotor and Mo. Note that within experimental error, the Ramscarbon conversion activities were the same. Initial desulfurization activities were also the same, within experimental error, and activity of the invention catalyst was higher after initial deactivation. Thus, the catalyst of the invention is as effective as the catalyst containing substantially more metals.

What is claimed is:

1. A process for the hydrodemetallation, hydrodesulfurization and hydrocracking of a hydrocarbon feedstock containing asphaltenes, metals, and Shell hot filtration solids precursors and the conversion of at least 30 vol.% of the feedstock fraction boiling over 1,000° F. to material boiling below 1,000° F. which comprises contacting said feedstock in at least one ebullated bed reaction zone with hydrogen and a hydrocracking catalyst comprising a Group VIB metal component and a cobalt component on a porous inorganic oxide support, wherein said Group VIB metal is present in an amount ranging from about 3.5 to about 5.0 wt.% calculated as an oxide and based on total catalyst weight, wherein said cobalt is present in an amount ranging from about 0.4 to about 0.8 wt.% calculated as an oxide and based on total catalyst weight, and wherein said catalyst has a surface area of about 150 to about 220 $m^2/gm$, a total pore volume of about 0.85 to about 1.5 cc/gm, and a pore volume in pores having diameters larger than 1,200 Å of about 0.15 to about 0.4 cc/gm.

2. The process of claim 1 wherein said Group VIB metal is molybdenum.

3. The process of claim 1 wherein said catalyst has a surface area of about 170 to about 200 $m^2/gm$, a total pore volume of about 1.0 to about 1.35 cc/gm, and wherein the pore volume of pores having a pore diameter greater than 1,200 Å ranges from about 0.2 to about 0.35 cc/gm.

4. The process of claim 1 wherein at least 70 vol.% of said fraction of the hydrocarbon feedstock boiling above 1,000° F. is converted to a material boiling below 1,000° F.

5. The process of claim 1 wherein the effluent therefore contains less then about 1.3 wt.% Shell hot filtration solids.

* * * * *

UNITED STATES PATENT OFFICE
CERTIFICATE OF CORRECTION

Patent No. 4,657,665                    Dated April 14, 1987

Inventor(s) William I. Beaton, Albert L. Hensley, & April J. Evans

It is certified that error appears in the above-identified patent and that said Letters Patent are hereby corrected as shown below:

PATENT

| Column | Line | |
|---|---|---|
| 3 | 44-45 | "it has discovered the addition," should read --it has been discovered that the addition-- |
| 4 | 44 | "well known," should read --well-known-- |
| 5 | 37 | before "nickel" insert --While metallic contaminants, such as vanadium-- |
| 5 | 61-63 | "(1951) 37," should read --(1951) 37-- |
| 6 | 20 | "by the invention," should read --of the invention-- |
| 6 | 48 | "an ebullated is," should read --an ebullated bed reactor is-- |
| 7 | 49 | "dryed," should read --dried-- |
| 8 | 48 | "phosphorus," should read --phosphorous-- |
| 9 | 4-5 | Dots in formulas are not CENTERED |
| 10 | 2 | "RAMS carbon" should read -- Ramscarbon -- |
| 10 | 16 | "heated 300°F," should read --heated at 300°F-- |
| 10 | 26 | "4 inches of 5/8." should read --/    ; of 1/8 |

Signed and Sealed this

Fifth Day of January, 1988

Attest:

DONALD J. QUIGG

Attesting Officer      Commissioner of Patents and Trademarks